M. H. AVRAM.
TIME RECORDER.
APPLICATION FILED APR. 5, 1905.

950,649.

Patented Mar. 1, 1910.
10 SHEETS—SHEET 1.

Fig: 1

WITNESSES:

INVENTOR
Moïs H. Avram.
BY

ATTORNEY

M. H. AVRAM.
TIME RECORDER.
APPLICATION FILED APR. 5, 1905.

950,649.

Patented Mar. 1, 1910.
10 SHEETS—SHEET 2.

WITNESSES:

INVENTOR
Moïs H. Avram.
BY
ATTORNEY

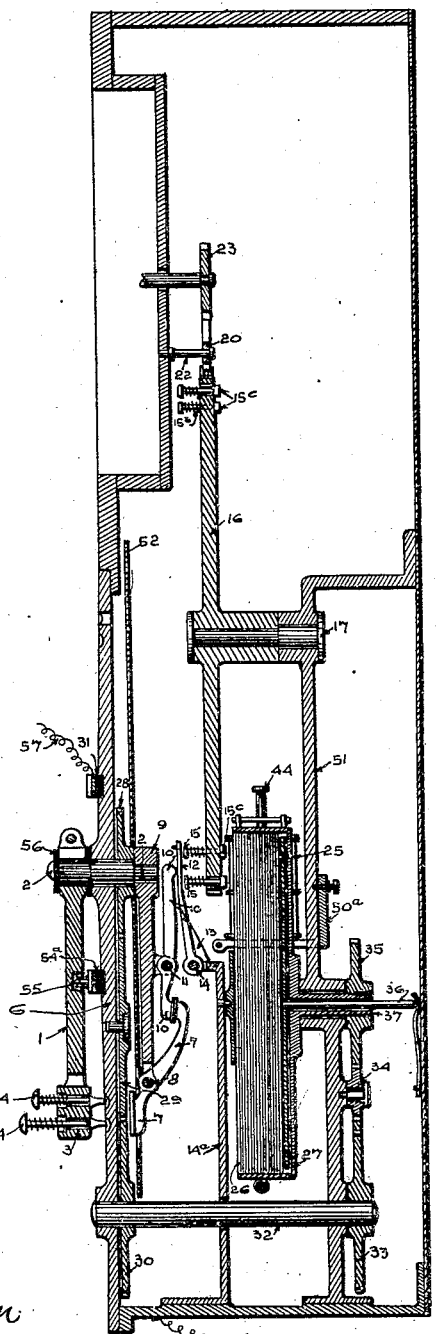

M. H. AVRAM.
TIME RECORDER.
APPLICATION FILED APR. 5, 1905.
950,649.
Patented Mar. 1, 1910.
10 SHEETS—SHEET 4.
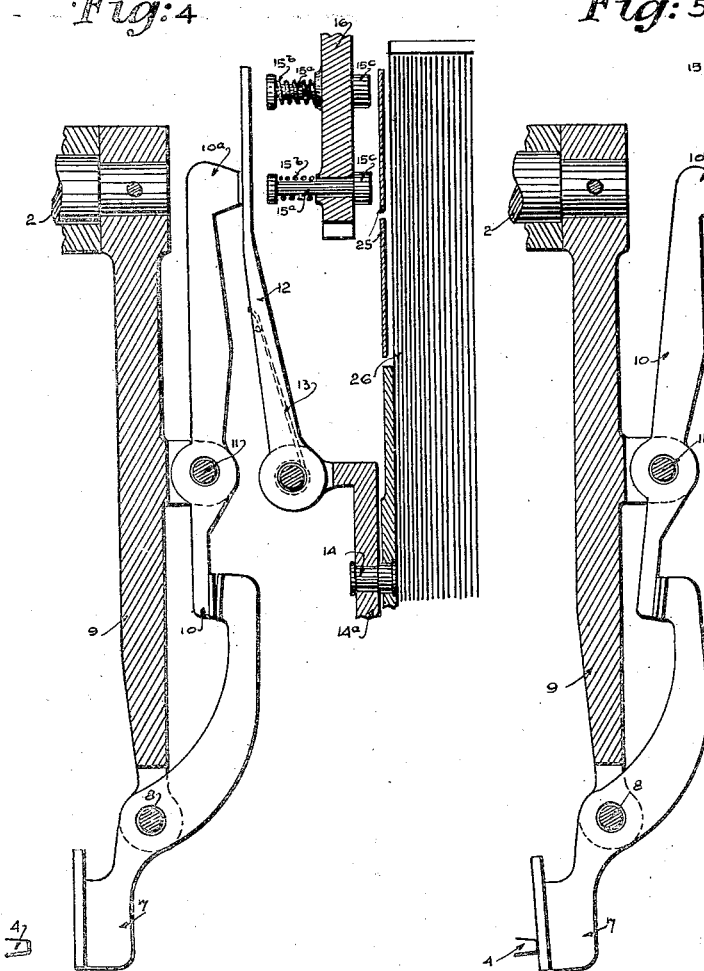
Fig: 4    Fig: 5
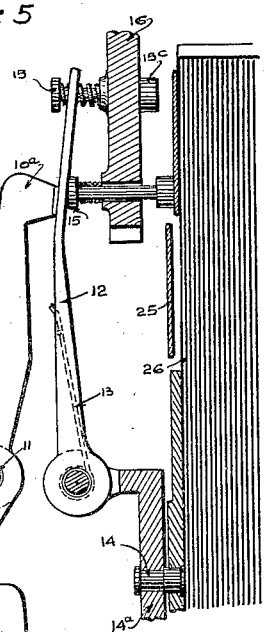
Fig: 20
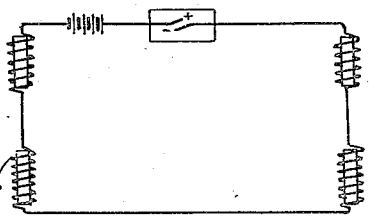
WITNESSES:
INVENTOR
Moïs H. Avram.
BY
ATTORNEY M. H. AVRAM.
TIME RECORDER.
APPLICATION FILED APR. 5, 1905.
950,649.
Patented Mar. 1, 1910.
10 SHEETS—SHEET 5.
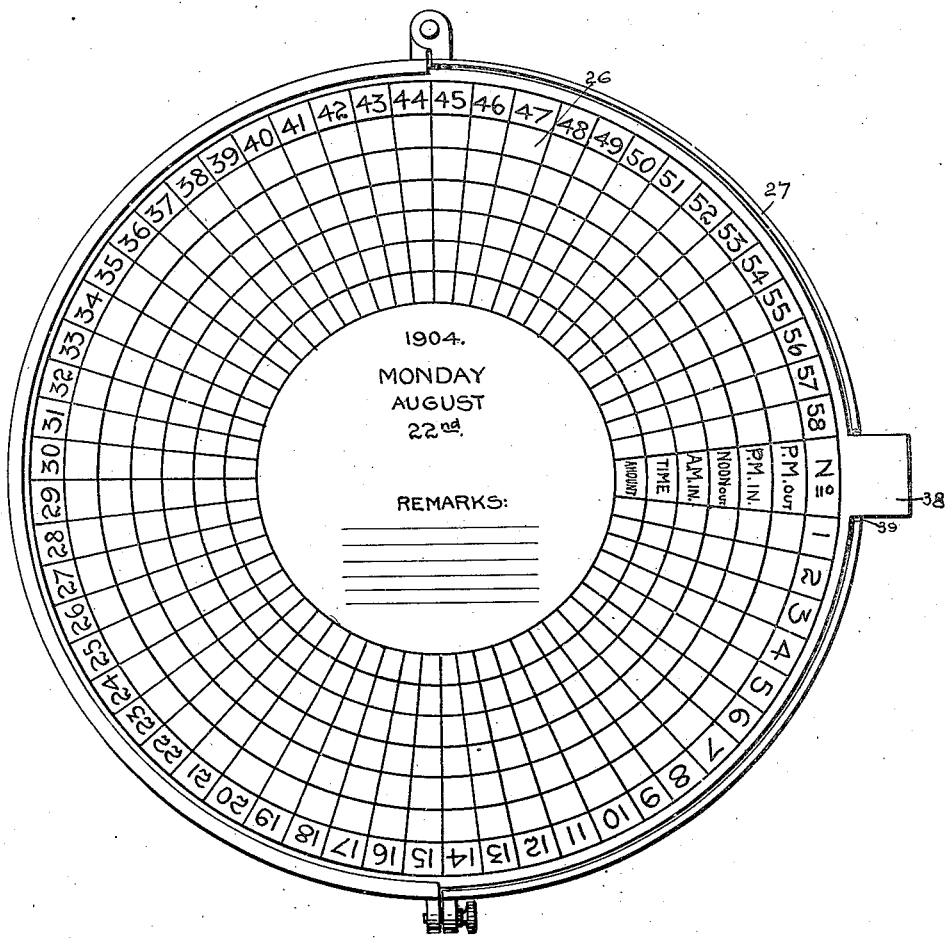
Fig: 6
WITNESSES:
INVENTOR
Moïs H. Avram.
ATTORNEY M. H. AVRAM.
TIME RECORDER.
APPLICATION FILED APR. 5, 1905.
950,649.
Patented Mar. 1, 1910.
10 SHEETS—SHEET 6.
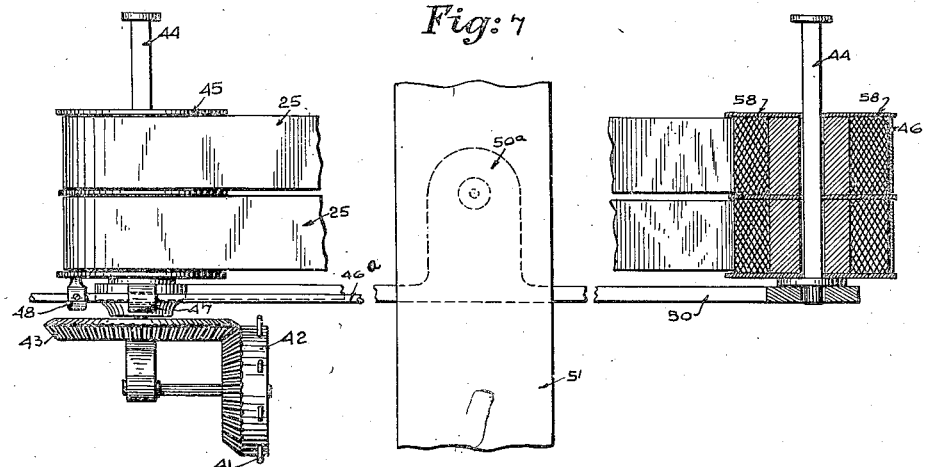
Fig: 7
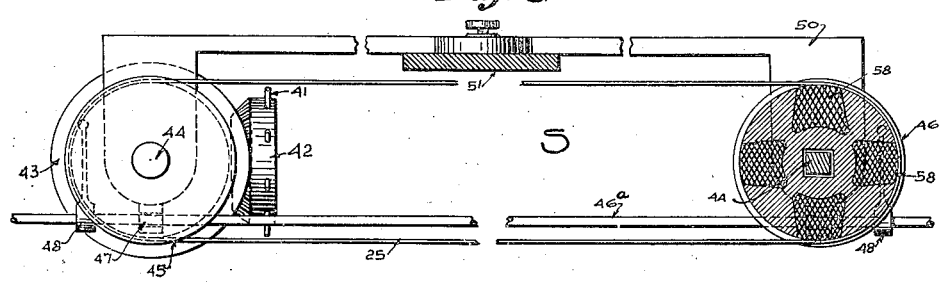
Fig: 8.
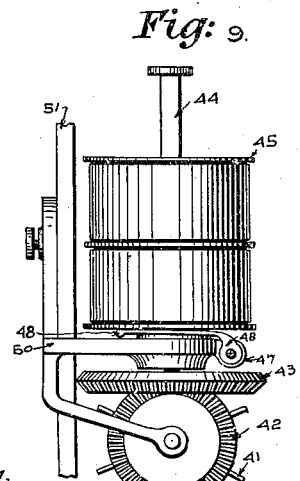
Fig: 9.
WITNESSES:
Walter E. Wallheim
Frank Ljamb
INVENTOR
Moïs H. Avram.
BY S. A. O. Rosell,
ATTORNEY

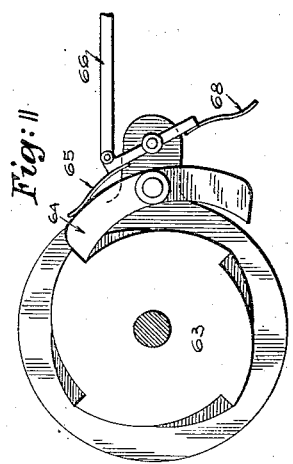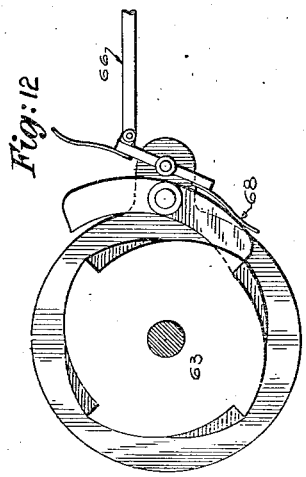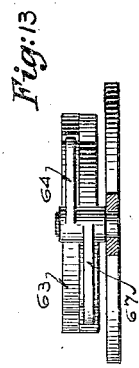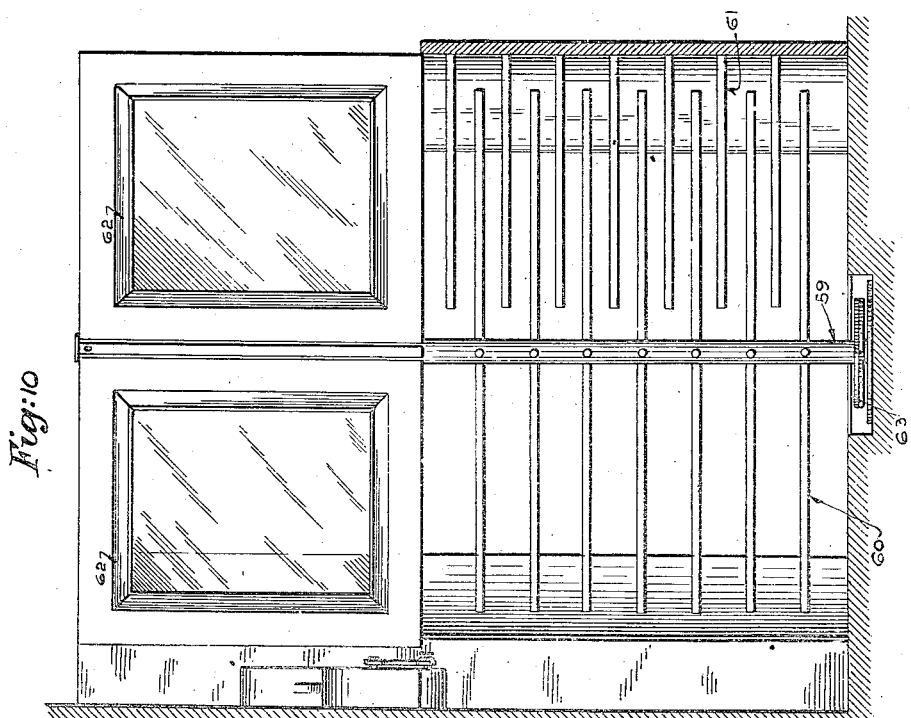

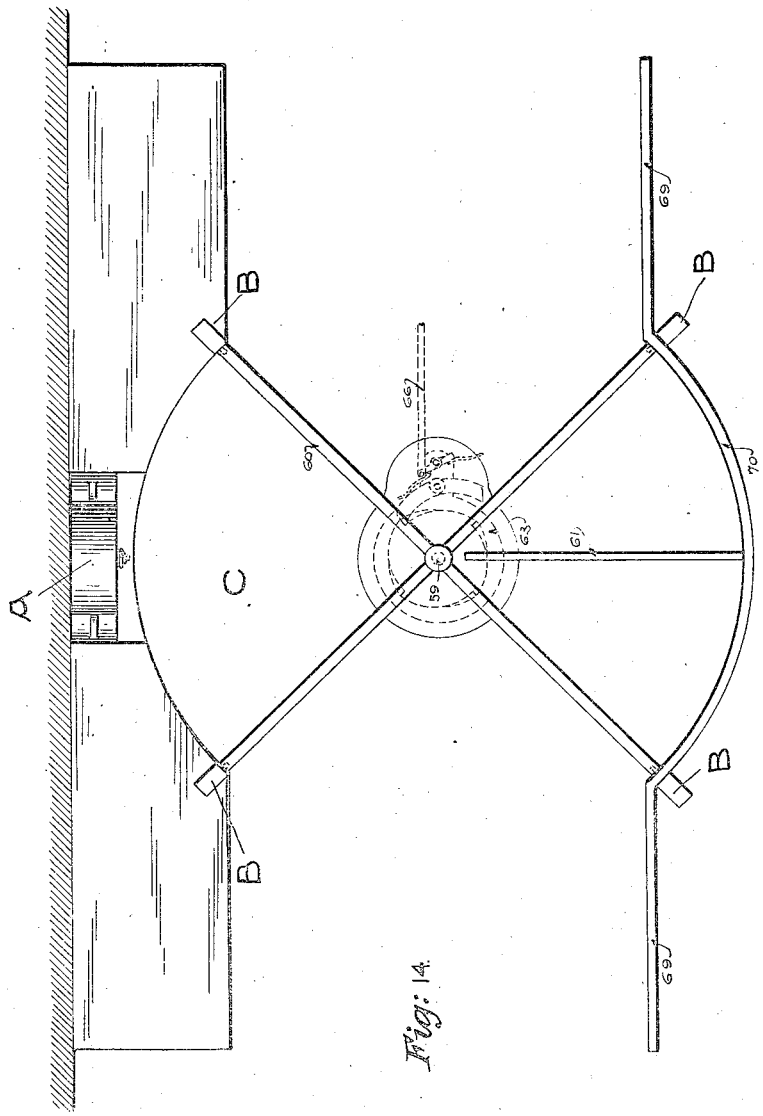

M. H. AVRAM.
TIME RECORDER.
APPLICATION FILED APR. 5, 1905.

950,649.

Patented Mar. 1, 1910.
10 SHEETS—SHEET 9.

WITNESSES:

INVENTOR

ATTORNEY

M. H. AVRAM.
TIME RECORDER.
APPLICATION FILED APR. 5, 1905.
950,649.
Patented Mar. 1, 1910.
10 SHEETS—SHEET 10.
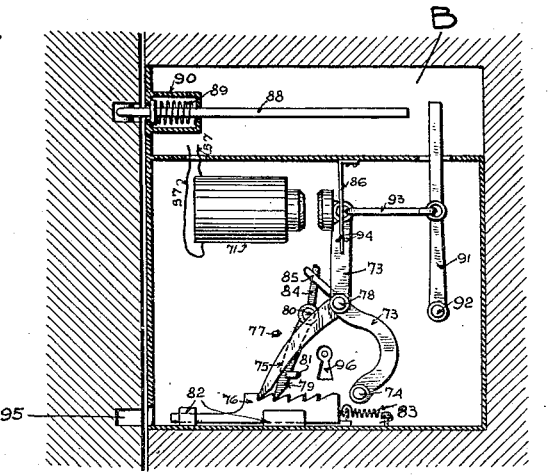
Fig: 16.
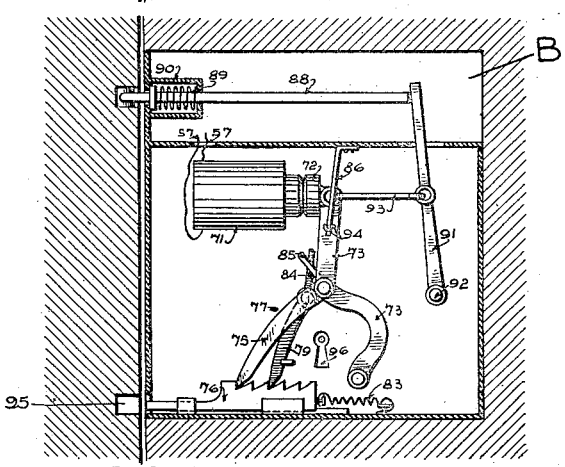
Fig: 17
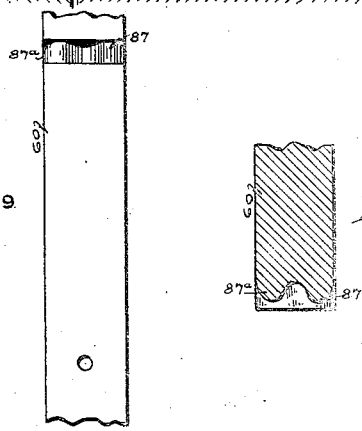
Fig: 19.    Fig: 18.
Witnesses
Walter E. Woelheim
Frank Lyons
Inventor
Moïs H. Avram.
By his Attorney

UNITED STATES PATENT OFFICE.

MOÏS H. AVRAM, OF NEW YORK, N. Y.

TIME-RECORDER.

950,649.

Specification of Letters Patent.   Patented Mar. 1, 1910.

Application filed April 5, 1905.   Serial No. 253,965.

*To all whom it may concern:*

Be it known that I, Moïs H. Avram, a citizen of the Kingdom of Roumania, and a resident of New York, in the county of New York and State of New York, have invented a certain new and useful Improvement in Time-Recorders, of which the following is a specification.

This invention relates to a new time recorder and a turn-stile to be used in connection with such recorder as will now be explained, reference being had to the drawings, in which—

Figure 1:
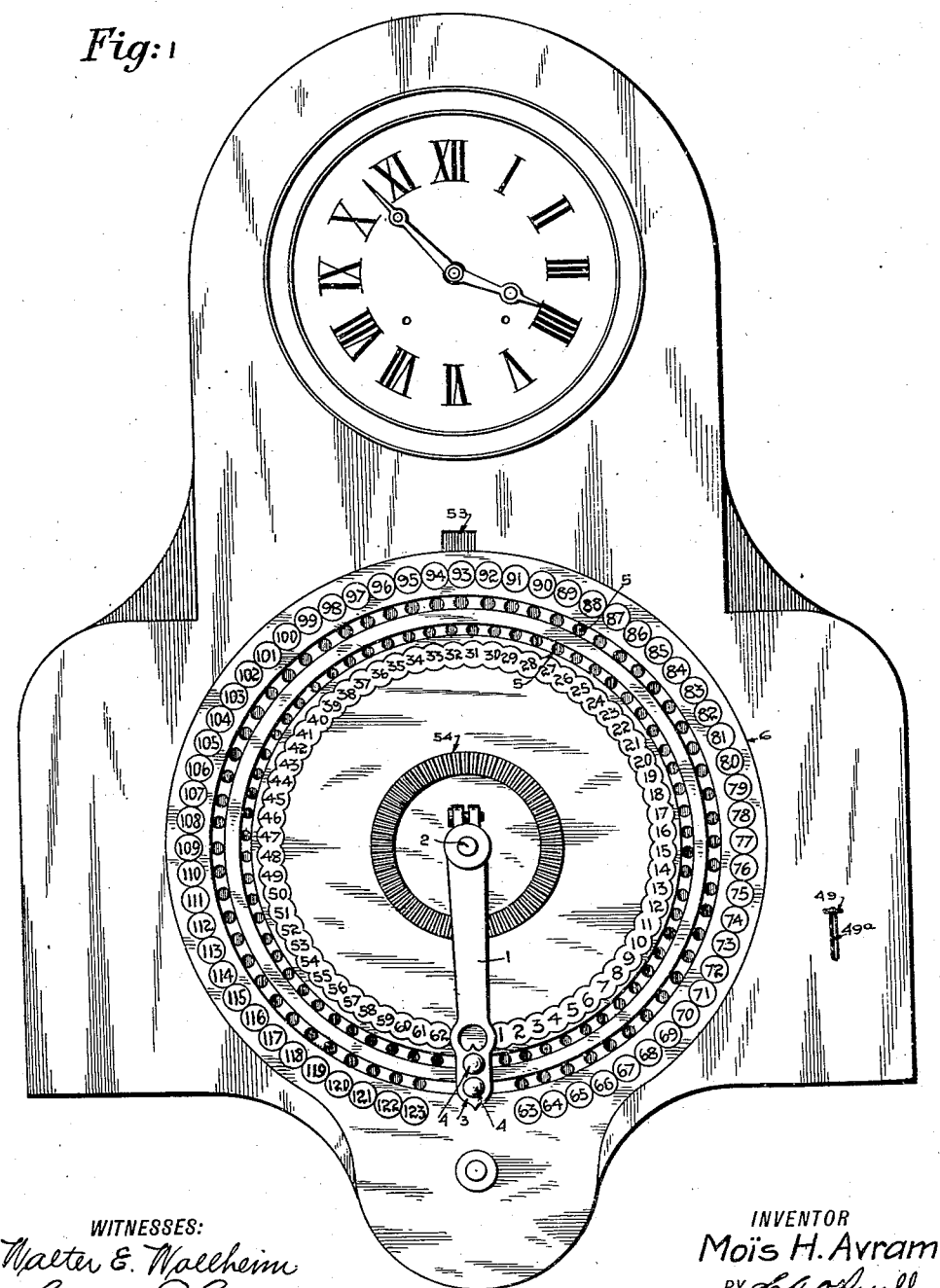
Figure 2:
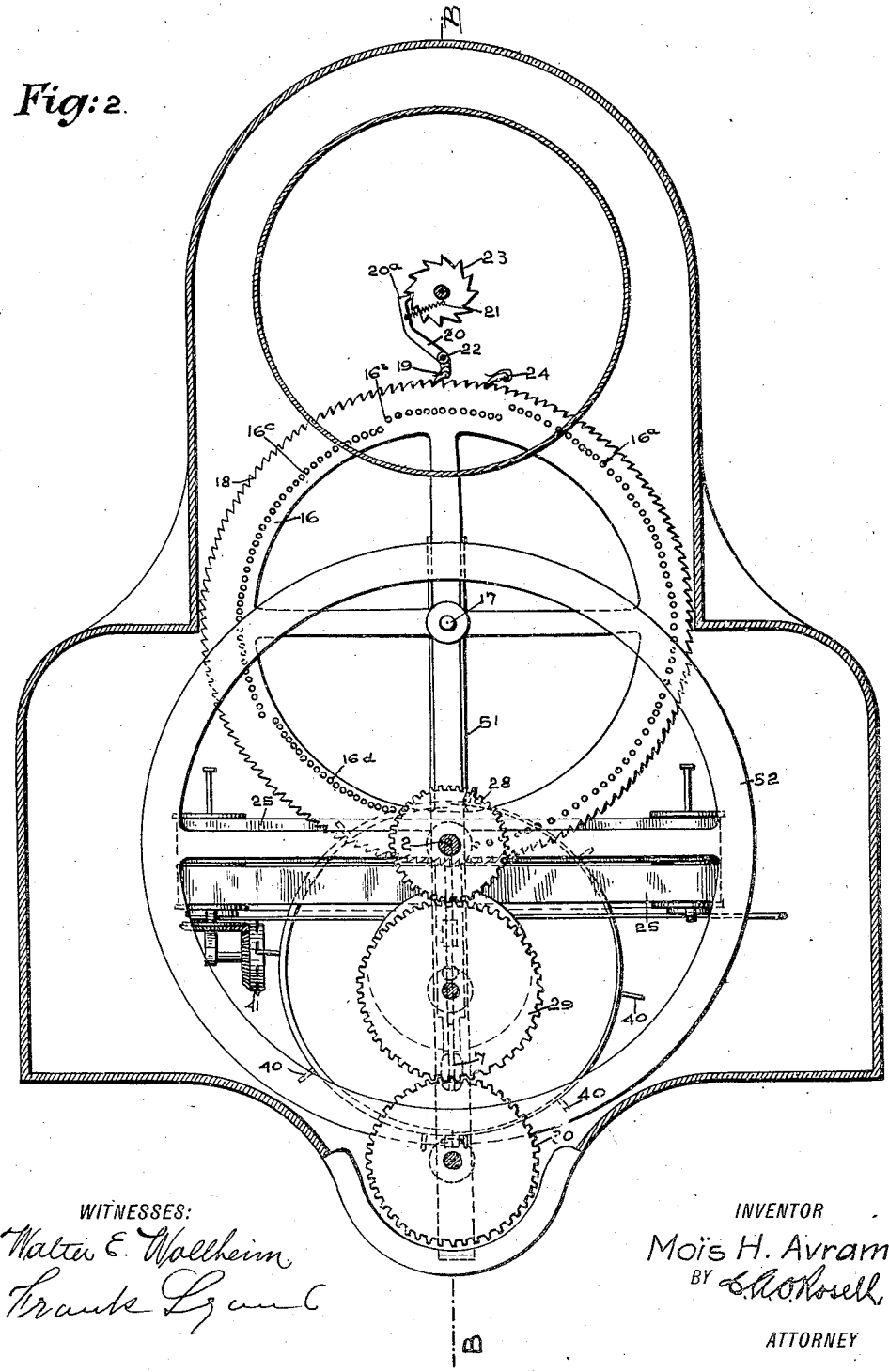
Figure 15:
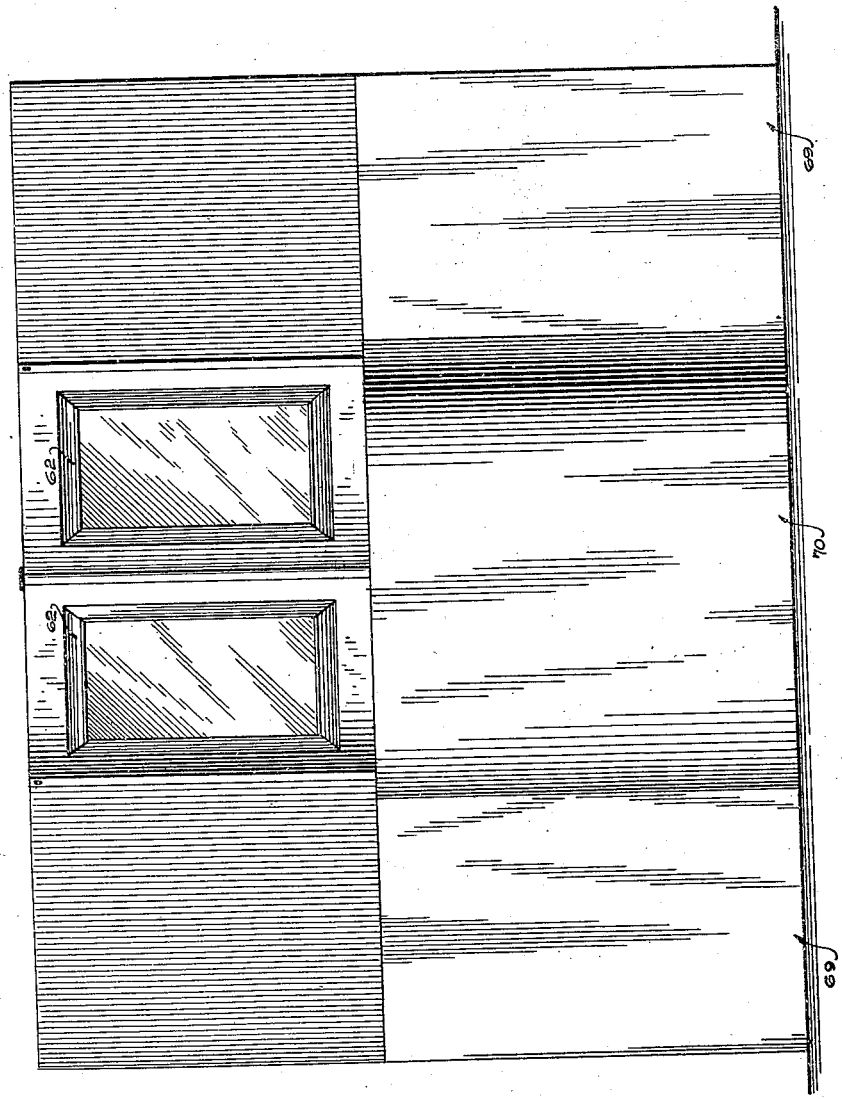

Figure 1 is a front view, showing the exterior of the recorder, Fig. 2 is a front view, with cover removed showing the actuating mechanism of the apparatus, Fig. 3 is a section on line B—B of Fig. 2, Figs. 4 and 5 are sections showing details of the printing mechanism, Fig. 6 shows a daily time record held in a cylindrical container, Fig. 7 is a broken elevation, partly in section of the printing ribbons and the mechanism actuating the same, Fig. 8 is a broken top view of the same elements as shown in Fig. 7, Fig. 9 is an end view of the same elements, Fig. 10 is a front elevation of a turn-stile in the entrance to a place using the recorder described, Fig. 11 is a top view of the pawl and ratchet with four teeth, forming a ratchet stop, limiting the motion of the turn-stile, Fig. 12 is a top view of the same ratchet and pawl, placed in position to act when the turn stile is moved in the opposite direction, Fig. 13 is a side view of the ratchet showing two ratchet wheels one above the other and two pawls or fingers, one to operate the upper ratchet wheel in one direction, and the other to operate the lower ratchet wheel in the opposite direction, Fig 14 is a top view of a turn-stile or revolving door, showing one of four possible positions in which a turn-stile may be placed at rest. In this figure is also shown the recorder and the ratchet stop. Fig. 15 shows an inclosure through which the turn-stile is entered, Figs. 16 and 17 are side views in elevation of a lock electrically operated by the recorder, which lock controls the movement of the turn-stile, Fig. 18 shows the curve of a cam placed upon each wing of the turn stile or revolving door, to operate the lock, Fig. 19 represents the edge of a wing showing its thickness or width and carrying the cam shown in Fig. 18, Fig. 20 is a diagrammatical representation of an electrical circuit connecting the recorder, a source of electricity and four electro-magnetic locks.

Similar characters represent the same elements throughout the drawings.

In the drawings, 1 is a lever rigidly connected at one end with spindle 2, its other end, 3, carrying registering spring buttons 4. These latter by the rotation of the lever 1, are brought over holes 5 in the plate 6, and if pressed, said buttons will act upon lever 7 as shown in Fig. 3. The lever 7 rotates about the spindle 2 simultaneously with lever 1, and has for its fulcrum a pin 8 on an arm 9, this latter being attached to and carried by spindle 2. It is seen that when lever 1 on the outside of the recorder assumes any position, the internal arm 9 follows or turns with it. Thus when one of the registering buttons is actuated so as to reach and press upon lever 7, the latter actuates a lever 10, which is carried by the same arm 9, and has for its fulcrum a pin 11. The lever 10 carries at its upper end a hammer $10^a$ which presses against a contact piece 12 which is pressed outward by a suitable spring 13, as shown in Figs. 3, 4 and 5. The contact piece 12 is held in place by a pin 14, which is attached to a frame $14^a$, and when acted upon by hammer $10^a$, presses upon the type buttons 15, carried by the type pins, $15^a$, passing through openings in a light wheel 16, and which are brought back to normal position by means of springs $15^b$. The type pins $15^a$ carry type plates $15^c$ by means of which the printing on the record sheet is done. The light wheel 16 is intermittently moved about an axis, 17, the intermission being made so as to make the wheel advance one step every five minutes, the motion being effected by means of ratchet teeth 18 (shown in Fig. 2) and also through the ratchet pawl 19 and arm 20, the latter being held in position by an independent spring 21. When the upper arm 20 is moved about its fulcrum 22 so that the point $20^a$ passes over one of the teeth of the clock wheel 23, constructed to revolve once an hour, the lower end of arm 20 with its pawl 19 will move toward the left, the pawl 18 passing over one tooth 18 of wheel 16, and when the clock wheel 23 moves just enough to liberate the point $20^a$ of the lever 20 the pawl 19 moves the wheel 16 one step. This motion is practically instantaneous. The time wheel 16 during this movement is controlled by a pawl and spring 24. The wheel 16 has 144 teeth, each tooth being actuated by the clock wheel 23 which has 12 teeth. Each type plate 15$^c$ carries a time figure, these figures being five minutes apart. When a button 15 is pressed, its corresponding type plate 15$^c$ will act upon a ribbon 25 and leave an impression or record on the uppermost of a number of properly prepared time record cards, carried by a cylinder 27, shown in Figs. 3 and 6. In order to print the time record opposite a desired number, the cylinder 27 is brought into such a position that the number selected in front of the recorder will correspond with the number on the time card. This is done by means of a set of gears 28, 29, 30, spindle 32 and gears 33, 34, and 35, this last being fastened to a tube 37 which carries the said cylinder 27. The numbers of the cards in the cylinder 27 are in this way made to register with the corresponding numbers in front of the recorder on account of the special ratio arranged between said gears.

It should be noticed that the cylinder 27 is deep enough to hold a great number of sheets as seen from Figs. 3, 4, and 5. In order to have all the time record cards 26 uniformly placed one on another there is a projection 38 on each card (Fig. 6). These projections cause the printing on each card to register with the corresponding number in front of the recorder, the cards being so placed in the cylinder 27 that all the projections 38 pass through a slot 39 on the cylinder, which slot holds the cards in position without rotation. The projection 38 on each card, will also serve as an extension or handle for the daily removal of such card.

The printing, as stated, is done through the type plates 15$^c$ and ribbons 25, which as seen in Figs. 2, 7, 8 and 9 are moved from time to time by a mechanism consisting of projecting pins 40, placed rigidly upon the card cylinder 27, said pins 40 occasionally coming in contact with and striking pins 41 on a wheel 42 which is so constructed that while one cylindrical side is being acted upon through the pins 41, the other side, conical and furnished with bevel teeth, meshes with another bevel wheel 43, which is fastened on a vertical spool 45, and rotates the same, presenting a new surface for the ribbon for a type plate to strike against.

The ribbons 25 are of the continuous or endless kind. The spools 45 and 46 carry the ribbons 25 and are directly opposite each other. They may be moved vertically upon the pins. Each of the two ribbons 25 is of a distinct color, and by this difference of color an indication may be made whether the registration on the card is one of entrance or one of exit.

In order to change the printing ribbons a rod 46$^a$ is used. This freely rotates in projections 47, and has at its ends fingers 48, which project under the spools 45 and 46 (Figs. 8 and 9). By means of these fingers 48 the spools may be raised or lowered at will by the rotation of the rod 46$^a$, such movement of the spools being preferably effected by hand by moving the handle 49, which is attached to rod 46 and projects to the exterior of the recorder through the slot 49$^a$.

The entire printing mechanism is supported by a stationary frame 50 (Figs. 7, 8, and 9). The frame 50 is attached to bracket 51 by means of the lug 50$^a$ (Figs. 3 and 7).

The time record card cylinder 27 is rotated in the space S between the opposite sides of the endless ribbons 25 as shown in Fig. 8.

54 is a ratchet wheel over which the lever 1 moves. A pin 55, supplied with a suitable spring, checks the motion of the lever 1, as it passes over the ratchet wheel 54. The ratchet wheel 54 is electrically insulated from the front plate 6 by insulating material 54$^a$. The lever 1 is also electrically insulated from the plate 6 by means of the hard rubber bushing 56.

57 are wires leading to a battery, the connection being made when the pin 4 touches the lever 7.

The pins 15 as before stated are carried by the wheel 16, which is provided with perforations for the purpose. Some of the perforations or holes are close to the periphery, others are close to the inside edge of the rim, and there are two intermediate groups of holes. These groups of holes are designated as 16$^a$, 16$^b$, 16$^c$, and 16$^d$ respectively. The purpose of this arrangement is to cause the type plates to print on the time-card 26, at different distances from the center, depending upon the time of the day. The proportion between the groups of holes may be varied at will. For instance, as illustrated in Fig. 2 the group 16$^a$ carries the type plates numbered serially at five minutes distance during the forenoon. The group of holes 16$^b$ carries type plates for the noon period. The group of holes 16$^c$ carries type plates for the afternoon, and the group of holes 16$^d$ carries type plates for the period of the evening departure.

The inking ribbons 25 are either prepared before insertion, in the ordinary way like typewriter ribbons, and are replaced when the ink carried by them is used up, or they have the ink applied to them while in use. In the drawings Figs. 7 and 8 show cages or receptacles 58, in the spool 46. The cages or receptacles 58 carry sponges or other porous material soaked or saturated with ink, which is imparted to the ribbons as they occasionally pass over the sponges in the motion around the spools, which has been described.

In Fig. 10, 59 represents a turn stile or revolving door consisting of four wings as shown in Fig. 14, each wing consisting of a number of horizontal bars, these bars passing between a number of stationary bars 61 as the turn stile revolves. The upper part of the turn-stile as shown consists of windows taking the place of the bars below. At the bottom of the turn-stile is a pawl and ratchet arrangement 63, shown in detail in Figs. 11 to 13. In Fig. 11 is shown a pawl 64, held in place by a spring 65 which is attached to a handle 66 which is movable so as to cause the upper pawl 64 or the lower pawl 67 (Fig. 13) to operate according as the turn stile is to be revolved in one direction or the other. Fig. 12 shows the same ratchet with the handle 66 pulled up, so as to cause the spring 68 to act upon the lower pawl 67, the handle 66 being fastened by any suitable means not shown.

In Figs. 14 and 15, 69 represents the side of the entrance through the turn-stile and 70 is a curved portion, inside of which are located the stationary bars 61 between which the bars 60 pass, as they revolve.

Fig. 14 shows the position of the time recorder A and the locking devices B.

Figs. 16 and 17 show the locking device B in detail. In these figures 71 represents an electromagnet connected with wires 57, 57, shown in Fig. 3. 72 is an armature actuated by the electromagnet 71. The armature is rigidly connected to the lever 73 fulcrumed at 74. To the lever 73 is attached a finger 75 which actuates a ratchet bolt 76. 77 is a pin limiting the motion of the pawl 75, which revolves around the pivot 78. 79 is a finger revolving around the pivot 80 and limited in its backward motion by pin 81. The ratchet bolt 76 moves in guides 82 and is connected with spring 83, which pulls it back when the fingers 75 and 79 are lifted up so as to clear the bolt. 84 is an extension of the finger 79 rigidly connected and moving with it, this extension being acted upon by the hooked portion of a prolongation 85 rigidly connected and moving with lever 73. 86 is a spring which brings back the armature to its normal position after the circuit is broken. 87 and 87ª, are two cams on the edge of each of the wings of the turn-stile as shown in Figs. 18 and 19. 88 is a rod, one end of which passes over one of the cams 87 and 87ª as the wing of the turn-stile is moved in either direction. 89 is a spring which presses the rod 88 against the door, said spring being held in place by a casing 90. 91 is a lever movable about the pivot 92. To the lever 91 is attached the link 93 which is flexibly connected with the lever 73 and pulls it back when the rod 88 passes over the cam 87 or 87ª, thereby releasing the fingers 75 and 79 so that the bolt 76 will be moved backward by the spring 83. 94 are pins on the lever 73 guiding the spring 86 in moving the lever 73 forward or backward. 95 are openings in the wings of the stile in which the bolts 76 enter on being actuated twice by the finger 75 through the lever 73.

The operation of the turn-stile and its locking mechanism is as follows: When the turn-stile is entered and the person entering is opposite the clock, the index lever is moved opposite the number desired when a button is pushed and registration is made. At the same time the electrical circuit is closed by means of the lever, push button, the frame of the recorder and the two wires 57, 57, the lever 1 being insulated from the frame of the recorder. By the closing of the circuit the electromagnet 71 is energized, attaching the armature 72 which operates the lever 73 pushing the bolt 76 forward one step by means of the finger 75. The bolt 76 having been moved one step is maintained in this position by means of finger 79 which remains unchanged in its position except when the rod 88 acts upon the lever 91. The finger 75 recedes with the lever 73 when the armature is released, the circuit being broken. Should an attempt be made to make two records without in the meantime turning the stile the bolt 76 will be pushed forward two steps and lock the stile so that the person making a double record would thereby be locked in the space C of Fig. 14 and would have to be released by the insertion of a key in the keyhole 96, the key moving the fingers 75 and 79 away from the teeth of the bolt sufficiently to clear the same and allow the spring 83 to act. In this way a man will be prevented from recording as present another person in addition to himself. As will be observed the cams 87 and 87ª act after each single registration, the cam 87 operating when the stile is turned in one direction and the cam 87ª when the stile is turned in the other direction the handle 66 having previously been set accordingly.

The advantage of this time recorder is its great simplicity and economy of manufacture, its reliability of operation and when used in connection with the turn-stile, its security against fraudulent registration.

What I claim as new is:—

1. The combination of a rotatable index lever, a casing to hold a circular record sheet, adapted to be moved simultaneously with and through the same angle as the index lever, gearing actuated by the lever, actuating gearing which causes the casing to revolve, and means for imparting a record to the record sheet.

2. The combination of a rotatable index lever, a push button, carried by the lever, a casing to hold a circular record sheet, adapted to be moved simultaneously with and through the same angle as the index lever, gearing actuated by the index lever, actuating gearing which causes the casing to revolve, and means for imparting a record to the record sheet.

3. The combination of an index lever, a spindle around which the index lever is adapted to revolve, means for carrying a rotatable circular record sheet, adapted to be moved simultaneously with and through the same angle as the index lever and so that a portion of its periphery is always opposite the spindle, and means for imparting a record to the record sheet.

4. The combination of an index lever, a spindle around which the index lever is adapted to revolve, means for carrying a rotatable circular record sheet, adapted to be moved simultaneously with and through the same angle as the index lever and so that a portion of its periphery is always opposite the spindle, and recording mechanism adapted to be simultaneously with and through the same angle as the index lever and to impart a record to the record sheet.

5. The combination of an index lever, a spindle around which the index lever is adapted to revolve, means for carrying a rotatable circular record sheet, adapted to be moved simultaneously with and through the same angle as the index lever and so that a portion of its periphery is always opposite the spindle, and a rotatable lever system adapted to be moved simultaneously with and through the same angle as the index lever and to impart a record to the record sheet.

6. The combination of an index lever, a spindle around which the index lever is adapted to revolve, a push button carried by the index lever, means for carrying a circular rotatable record sheet, adapted to be moved simultaneously with and through the same angle as the index lever and so that a portion of its periphery is always opposite the spindle, and means for imparting a record to the record sheet.

7. The combination of an index lever, a spindle around which the index lever is adapted to revolve, a push button carried by the index lever, means for carrying a rotatable circular record sheet, adapted to be moved simultaneously with and through the same angle as the index lever, and so that a portion of its periphery is always opposite the spindle, a rotatable lever system adapted to be moved simultaneously with and through the same angle as the index lever, and means for imparting a record to the record sheet.

8. The combination of an index lever, a spindle around which the index lever is adapted to revolve, a casing to hold a circular record sheet, adapted to be moved simultaneously with and through the same angle as the index lever and so that a portion of its periphery is always opposite the spindle, gearing actuated by the index lever, actuating gearing which causes the casing to revolve, and means for imparting a record to the record sheet.

9. The combination of a rotatable index lever, a push button carried by the index lever, a casing to hold a circular record sheet, adapted to be moved simultaneously with and through the same angle as the index lever, a lever system adapted to be moved simultaneously with and through the same angle as the index lever, gearing actuated by the index lever, actuating gearing which causes the casing to revolve, and means for imparting a record to the record sheet.

10. The combination of a rotatable index lever, a push button carried by the lever, means for carrying a rotatable circular record sheet, adapted to be moved simultaneously with and through the same angle as the index lever, a casing to hold the record sheet, gearing actuated by the index lever, actuating gearing which causes the casing to revolve, a lever system adapted to be moved simultaneously with and through the same angle as the index lever, and a spring bar between the lever system and the record sheet, the push button, lever system and spring bar being adapted to interact so as to impart a record to the record sheet.

11. The combination of a spindle, an index lever secured thereto, a push button carried by said lever, means for carrying a rotatable circular record sheet adapted to be moved simultaneously with and through the same angle as the index lever, and so that a portion of its periphery is always opposite the spindle, a rotatable lever system, adapted to be moved simultaneously with and through the same angle as the index lever, and a spring bar between the lever system and the record sheet, the push button, lever system and spring bar being adapted to interact so as to impart a record to the record sheet.

12. The combination of a rotatable index lever, a push button carried by the lever, means for carrying a rotatable record sheet, adapted to be moved simultaneously with and through the same angle as the index lever, a casing to hold the record sheet, gearing actuated by the index lever, actuating gearing which causes the casing to revolve, a lever system adapted to be moved simultaneously with and through the same angle as the index lever, a spring bar between the lever system and the record sheet and type bars; the lever system, spring bar and type bars being adapted to interact so as to impart a record to the record sheet.

13. The combination of a spindle, and index lever secured thereto, means for carrying a rotatable record sheet, adapted to be moved simultaneously with and through the same angle as the index lever and so that a portion of its periphery is always opposite the spindle, a rotatable lever system, adapted to be moved simultaneously with and through the same angle as the index lever, a spring bar between the lever system and the record sheet and type bars; the lever system, spring bar and type bars being adapted to interact so as to impart a record to the record sheet.

14. The combination of a lever system, a spring bar, a type wheel adapted to move intermittently, type bars carried by the type wheel and parallel with the axis of the type wheel, and means for carrying a circular record sheet, the lever system, spring bar and type bars being adapted to impart a record to the record sheet.

15. The combination of a rotatable index lever, means for carrying a rotatable record sheet, a lever system, adapted to be moved simultaneously with and through the same angle as the index lever, a spring bar and a type wheel between the lever system and the record sheet, and type bars parallel with the axis of the type wheel, the lever system, spring bar and type bars being adapted to interact so as to impart a record to the record sheet.

16. The combination of a rotatable index lever, means for carrying a rotatable record sheet, a lever system, adapted to be moved simultaneously with and through the same angle as the index lever, a spring bar, and a type wheel adapted to be moved intermittently and carrying type bars parallel with the axis of the type wheel, the lever system spring bar and type bars being adapted to interact so as to impart a record to the record sheet.

17. The combination of a rotatable index lever, a push button carried by the index lever, means for carrying a rotatable record sheet, a lever system, adapted to be moved simultaneously with and through the same angle as the index lever, a spring bar, and a type wheel adapted to be moved intermittently and carrying type bars parallel with the axis of the type wheel, the lever system spring bar and type bars being adapted to interact so as to impart a record to the record sheet.

18. The combination of a rotatable index lever, a push button carried by the lever, a casing to hold a record sheet, adapted to be moved simultaneously with and through the same angle as the index lever, gearing actuated by the index lever, actuating gearing which causes the casing to revolve, a spring bar, and a type wheel adapted to be moved intermittently and carrying type bars parallel with the axis of the type wheel, the lever system spring bar and type bars being adapted to interact so as to impart a record to the record sheet.

19. The combination of a spindle, an index lever secured thereto, means for carrying a rotatable record sheet, adapted to be moved simultaneously with and through the same angle as the index lever and so that a portion of its periphery is always opposite the spindle, a rotatable lever system adapted to be moved simultaneously with and through the same angle as the index lever, a spring bar and a type wheel adapted to be moved intermittently and carrying type bars parallel with the axis of the type wheel, the lever system spring bar and type bars being adapted to interact so as to impart a record to the record sheet.

20. The combination of a spindle, an index lever secured thereto, a push button carried by the index lever, means for carrying a rotatable record sheet, adapted to be moved simultaneously with and through the same angle as the index lever and so that a portion of its periphery is always opposite the spindle, a rotatable lever system adapted to be moved simultaneously with and through the same angle as the index lever, a spring bar, and a type wheel adapted to be moved intermittently and carrying type bars parallel with the axis of the type wheel, the lever system spring bar and type bars being adapted to interact so as to impart a record to the record sheet.

21. The combination of a rotatable index lever, an endless inking ribbon, spools carrying the ribbon, means for carrying a circular record sheet between the sides of the inking ribbon, means for lifting or lowering the spools and the ribbon and means for causing the inking ribbon to impart a record to the record sheet.

22. The combination of a rotatable index lever, an endless inking ribbon, spools carrying the ribbon, means for carrying a circular record sheet between the sides of the inking ribbon, means for revolving the spools, means for automatically imparting ink to the ribbon, and means for causing the inking ribbon to impart a record to the record sheet.

23. The combination of an entrance gate, a time recorder controlling the gate and located in the passage of the gate, a locking mechanism and an electrical circuit connecting the recorder and the locking mechanism.

24. The combination of a turn-stile, a time recorder located in the passage of the turn-stile and controlling the turn-stile, a locking mechanism and an electrical circuit connecting the recorder and the locking mechanism.

25. The combination of a turn-stile, a time recorder, and means for automatically locking the turn-stile when two records are made in succession without moving the turn-stile through on angle equal to one of the divisions of the stile.

26. The combination of a turn-stile, a time recorder, located in the passage of the turn-stile a locking mechanism, an electrical circuit connecting the recorder and the locking mechanism, a locking bolt and means for advancing the bolt far enough to lock the stile when more than one record is made without moving the turn-stile through an angle equal to one of the divisions of the stile.

27. The combination of a turn-stile, a time recorder, located in the passage of the turn-stile, a locking bolt, means for advancing the bolt a distance insufficient to lock the stile when one record has been made after the stile has been turned and means for advancing the bolt far enough to lock the stile when more than one record is made without moving the turn-stile through an angle equal to one of the divisions of the stile.

Signed at New York, in the county of New York and State of New York this 4th day of April A. D. 1905.

MOÏS H. AVRAM.

Witnesses:
FRANK LYONS,
C. A. O. ROSELL.